United States Patent [19]
Aoyama

[11] Patent Number: 5,221,292
[45] Date of Patent: Jun. 22, 1993

[54] AIR CLEANING SYSTEM FOR VEHICLE PASSENGER COMPARTMENT

[75] Inventor: Masutoshi Aoyama, Saitama, Japan

[73] Assignee: Kansei Corporation, Omiya, Japan

[21] Appl. No.: 827,461

[22] Filed: Jan. 29, 1992

[30] Foreign Application Priority Data

Jan. 30, 1991 [JP] Japan .................. 3-2671[U]

[51] Int. Cl.⁵ .................. B01D 53/30; B01D 46/02; B01D 50/00
[52] U.S. Cl. .................. 55/270; 55/279; 55/316; 55/385.3; 55/467; 454/75; 454/158
[58] Field of Search .......... 55/270, 279, 316, 385.3, 55/467; 454/75, 139, 150, 151, 158, 162

[56] References Cited

U.S. PATENT DOCUMENTS

| | | | |
|---|---|---|---|
| 4,007,875 | 2/1977 | Stolz et al. | 55/385.3 X |
| 4,531,453 | 7/1985 | Warman et al. | 454/139 |
| 4,658,707 | 4/1987 | Hawkins et al. | 454/75 |
| 4,702,753 | 10/1987 | Kowalczyk | 454/158 X |
| 4,711,159 | 12/1987 | Armbruster | 454/158 X |
| 4,858,676 | 8/1989 | Bolcik et al. | 454/75 X |

*Primary Examiner*—Charles Hart
*Attorney, Agent, or Firm*—Foley & Lardner

[57] ABSTRACT

An air cleaning system for a vehicle passenger compartment comprises of a first air cleaner unit and a second air cleaner unit. The first air cleaner unit is arranged to discharge air of the vehicle passenger compartment to the outside of the vehicle and to circulate the air upon cleaning the air. The second air cleaner unit is arranged to inhale outside air into the vehicle passenger compartment upon cleaning the outside air. When the air pollution level in the vehicle passenger compartment is high, the air cleaning system is operated to inhale outside air due to the operation of the second air cleaner unit and to discharge inside air due to the operation of the first air cleaner unit. Furthermore, the first air cleaner unit is formed in a thin-box shape and installed on a rear parcel shelf so as to improve the rearward visibility.

9 Claims, 9 Drawing Sheets

AIR CLEANING SYSTEM FOR VEHICLE PASSENGER COMPARTMENT

BACKGROUND OF THE INVENTION

1. Field of the Invention

The present invention relates to improvements in an air cleaning system for cleaning the polluted air in a vehicle passenger compartment.

2. Description of the Prior Art

It is well known that various kinds of air cleaning systems have been proposed and used practically for cleaning air in a vehicle passenger compartment. A typical air cleaning system includes an air cleaner unit which is disposed on a rear parcel shelf in the vehicle passenger compartment. The air cleaner unit is provided with a fan unit, and an air filter unit made of a dust filter and a deodorizing filter. The air cleaner unit is designed to suck air from the vehicle passenger compartment therein by means of the fan unit and to deliver the air to the vehicle passenger compartment after cleaning the air by the air filter unit.

However, due to the limitation of size and cleaning capacity of the air cleaner unit, it takes a relatively long time for such an air cleaning system to accomplish the cleaning operation when the air in the vehicle passenger compartment contains a large quantity of impurities such as tobacco smoke. Furthermore, if the driver wishes to obtain fresh air from the outside of the vehicle such an air cleaning unit can cause a problem in that, if the street is busy, exhaust gasses are sucked in the passenger compartment and the air in the compartment is rapidly polluted.

SUMMARY OF THE INVENTION

It is an object of the present invention to provide an improved air cleaning system in which the polluted air in the vehicle passenger compartment is rapidly cleaned.

Another object of the present invention is to provide an improved air cleaner unit which is formed in a thin-box shape and installed to a rear parcel shelf so as not to obstruct the rear visibility of a driver.

An aspect of the present invention resides in an air cleaning system for a vehicle passenger. The air cleaning system comprises a first air cleaner unit which includes means for discharging air from the vehicle passenger compartment to the outside of the vehicle. A second air cleaner unit includes means for inhaling outside air into the vehicle passenger compartment and for cleaning the outside air. The air discharging means of the first air cleaner unit is operated when the outside air inhaling means is operated.

Another aspect of the present invention resides in an air cleaner unit disposed on a rear parcel shelf in a vehicle passenger compartment of a vehicle. The air cleaner unit comprises a casing which has an air intake port communicated with the vehicle passenger compartment, an air delivery port communicated with the vehicle passenger compartment and an air discharge port communicated with the outside of the vehicle. An air filter unit is disposed in the casing so that the air fed into the casing is cleaned by the air filter unit and fed to the vehicle passenger compartment through the air delivery port. A fan is used to feed air from the vehicle passenger compartment to the outside of the vehicle. A motor for rotating the fan is disposed to pass through a lower portion of the casing and the rear parcel shelf and to extend downwardly. A valve is connected to the casing and enables first and second states to exist. In the first state the air intake port is communicated with the air discharge port. In the second state in that the air intake port is connected with the air delivery port through the air filter unit.

A further object of the present invention resides in an air cleaning system which is disposed on a rear parcel shelf in a vehicle passenger compartment of a vehicle. The air cleaning system comprises a casing which has an air intake port communicated with the vehicle passenger compartment, an air delivery port communicated with the vehicle passenger compartment and an air discharge port communicated with the outside of the vehicle. An air filter unit is disposed in the casing so that the air fed into the casing is cleaned by the air filter unit and fed to the vehicle passenger compartment through the air delivery port. A fan unit is arranged to feed air from the vehicle passenger compartment to either of the vehicle passenger compartment or the outside of the vehicle. A valve which is connected to the casing can cause two state a first state in that the air intake port is communicated with the air discharge port and a second state in that the air intake port is communicated with the air delivery port through the air filter unit. A smoke sensor is disposed in the vehicle passenger compartment and detects the air pollution level in the vehicle passenger compartment. The smoke sensor outputs a signal to the valve and the fan unit to discharge the air of the vehicle passenger compartment to the outside of the vehicle when the air pollution level in the vehicle passenger compartment is higher than a predetermined level.

With this arrangement, when the air pollution level in the vehicle passenger compartment (where the air pollution level indicates a pollution degree of air in the vehicle passenger compartment) is low, only the first air cleaner unit is operated to clean and circulate air in the vehicle passenger compartment. When the air pollution level becomes high, the second air cleaner unit is operated to inhale and clean outside air, and to feed the cleaned outside air into the vehicle passenger compartment. Furthermore, the first air cleaner unit is operated to discharge the polluted air of the vehicle passenger compartment to the outside of the vehicle. Additionally, the first air cleaner unit is arranged so as not to obstruct the rear view for a driver of the vehicle by arranging in a manner that the motor is disposed to pass through the rear parcel shelf and to extend downwardly and that the outer casing 3 is formed in a thin-box shape. Accordingly, the rear visibility for the driver is remarkably improved.

BRIEF DESCRIPTION OF THE DRAWINGS

In the drawings, like reference numerals designate like parts and elements throughout all figures, in which.

DETAILED DESCRIPTION OF THE INVENTION

Figure 1:
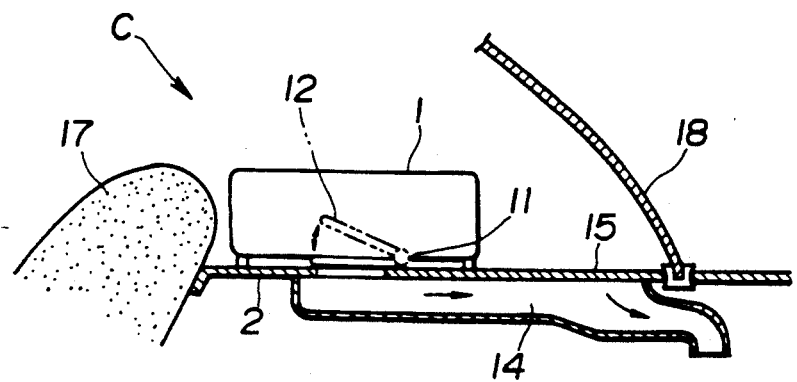
FIG. 1 is a side sectional view of a rear portion of a vehicle passenger compartment to which a first air cleaner unit used in the first embodiment of an air cleaning system is disposed.
Figure 2:
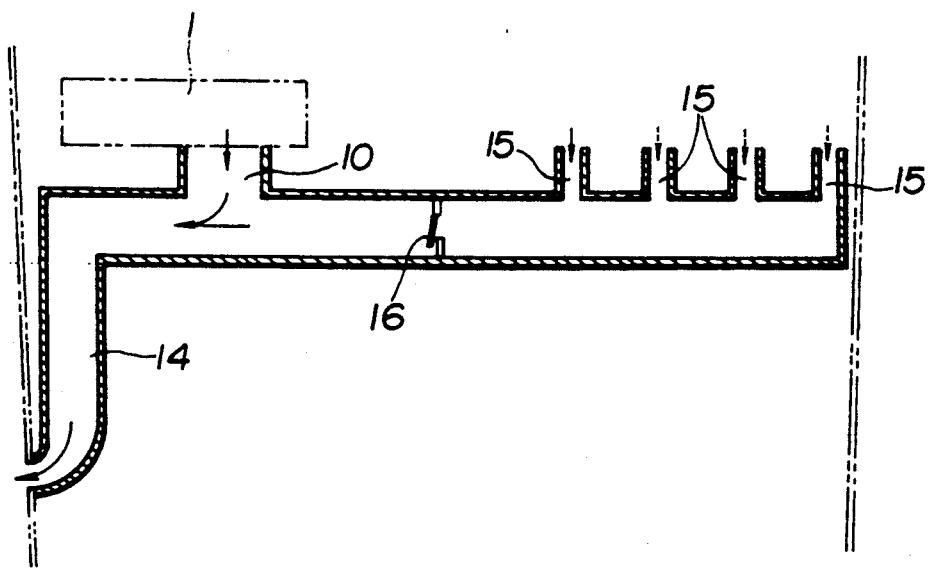
FIG. 2 is a schematic view of a discharge duct applied to the first embodiment of the air cleaning system.
Figure 3:
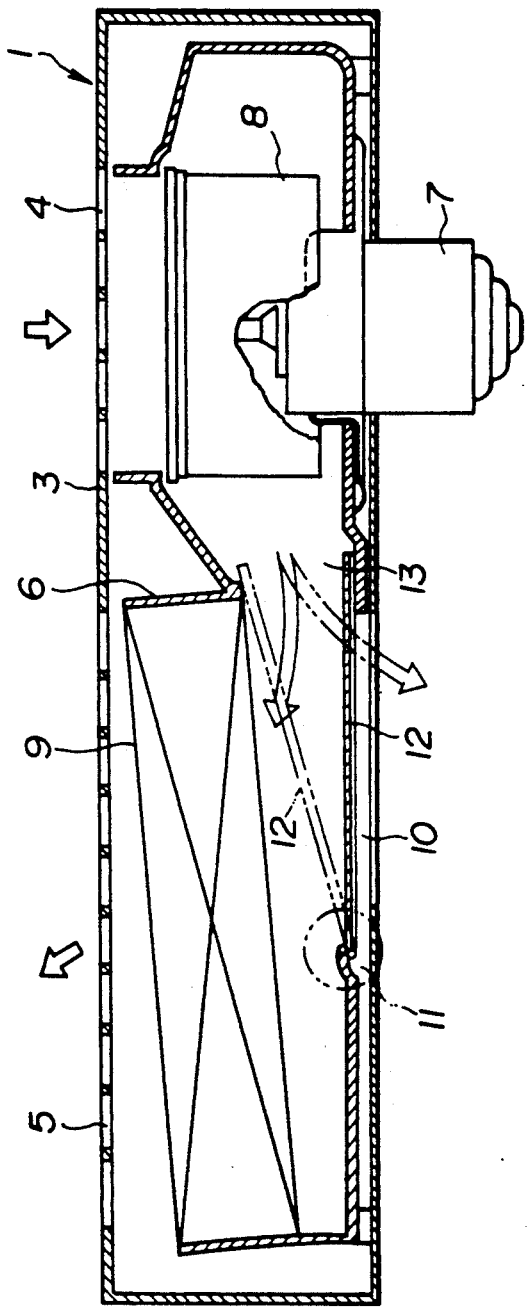
FIG. 3 is a side cross-sectional view of the first air cleaner unit of the first embodiment.

Referring now to FIGS. 1 to 5, there is shown a first embodiment of an air cleaning system S for a vehicle passenger compartment C in accordance with the present invention.

The air cleaning system S comprises a first air cleaner unit 1 which is disposed on a rear parcel shelf 2 located between a rear seat back 17 and a rear window 18 in the vehicle passenger compartment C. The first air cleaner unit 1 includes an outer casing 3 which has an inlet port 4 and a delivery port 5. An inner casing 6 is disposed in the outer casing 3 and provided with a fan 8 rotated by a motor 7 disposed in the vicinity of the inlet port 4. The motor 7 is arranged so as to pass through the rear parcel shelf 2 and to extend downward. An air filter unit 9 for cleaning air fed in the first air cleaner unit 1 includes a dust filter (no numeral) and a deodorizing filter (no numeral) and is disposed in the inner casing 6 so as to be located in the vicinity of the delivery port 5. The inner casing 6 is provided at its bottom portion with a discharge port 10 through which air fed to the first air cleaner unit 1 is discharged to the outside of the vehicle. The discharge port 10 is arranged to be opened and closed by a valve 12 which is rotatably connected to the inner casing 6 and moved by a motor 11. Accordingly, when the valve 12 is operated to open the discharge port 10, the valve 12 is simultaneously set to close a passage (no numeral) for guiding air to the air filter unit 9. With this operation, air from the vehicle passenger compartment C is prevented from being fed to the air filter unit 9 and is fed to the outside of the vehicle through an air discharge passage 14 which is disposed under the rear parcel shelf 2. Thus, the valve 12 is arranged to be connected to the inner casing 6 so as to take one of first and second states. When the valve is set to the first state, the air inlet port 5 is communicated with the discharge port 10. When the valve 12 is set to the second state, the air inlet port 5 is communicated with the air delivery port 6 through the air filter unit 9. The air discharge passage 14 is connected to the discharge port 10 and is arranged to be connected to a plurality of inside-air discharge ports 15 through a one way valve 16 which permits only to flow air from the inside-air discharge port 15 to the air discharge passage 14.

Figure 4:
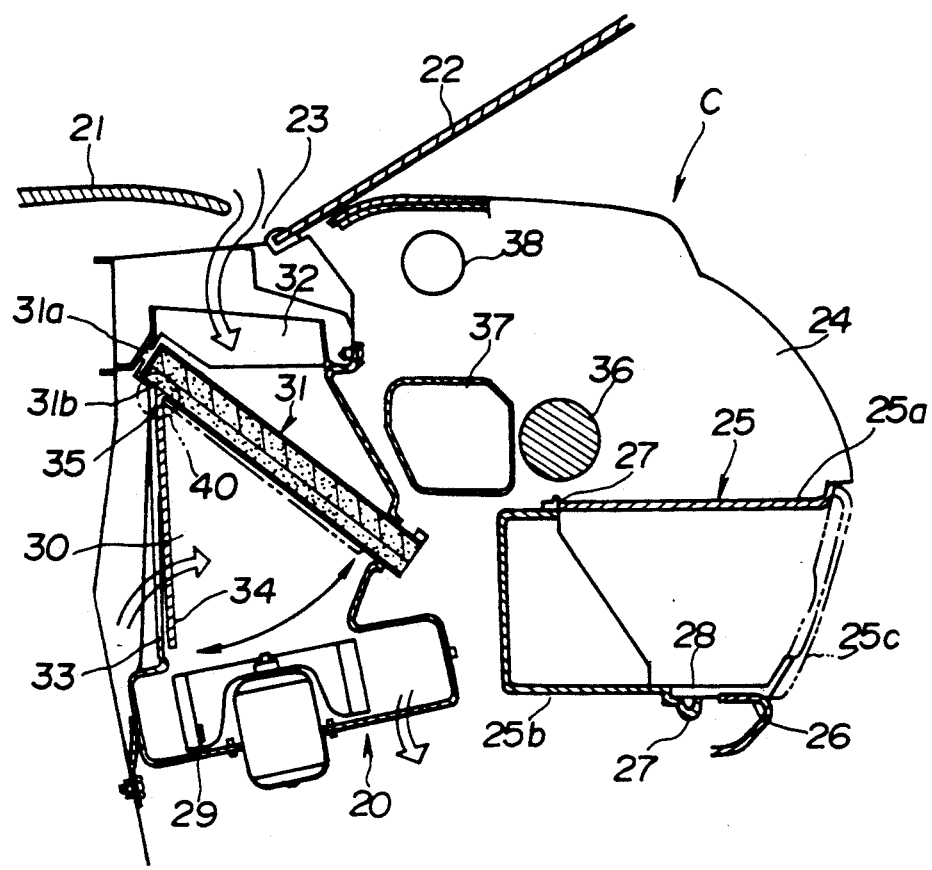
FIG. 4 is a side cross-sectional view of a second air cleaner unit applied to the first embodiment.

FIG. 4 shows a second air cleaner unit 20 which is disposed under a bonnet 21 and a front window 22 of the vehicle. An outside-air intake port 23 for taking outside air in the second air cleaner unit 20 is formed between the bonnet 21 and the front window 22. The second air cleaner unit 20 includes a fan unit 29 which is disposed in an instrument panel 24 and whose intake side is communicated with the outside-air intake port 23 through an air duct 30. A second air filter unit 31 including a paper filter 31a and an activated carbon filter 31b is detachably disposed in the air duct 30 so that its filtering surface is inclinedly positioned relative to the axial direction of the air duct 30 in order to ensure a filtering surface area larger than a cross-sectional area of the air duct 30. The air duct 30 includes an outside-air inlet port 32 and an inside-air inlet port 33. The inside-air inlet port 33 is closed and opened by a valve 34 which is rotatably supported to a rotating shaft 35 for rotating the valve 34 by a motor 40. The valve 34 is arranged to prevent outside air from flowing through the second air filter unit 31 into the vehicle passenger compartment C when the inside-air inlet port 33 is in an opening position. The instrument panel 24 includes a glove box 25 which is formed by a front member 25a, a rear member 25b and a cover member 25c for closing an opening portion of the front member 25a. The front member 25a is fixed to the instrument panel 24 by attaching screws 26. The rear member 25b is detachably attached to the front member 25a through a fixing portion 27 and detachably fixed by attaching screws 28. As shown in FIG. 4, numeral 36 designates a steering member, 37 designates a side vent duct, and 38 designates a side defroster duct.

When the inside-air inlet port 33 is closed by the valve 34, the outside air flows into the vehicle passenger compartment C through the outside-air intake port 23, the outside-air inlet port 32 and then through the second air filter unit 31. Accordingly, the vehicle passenger compartment C is filled with cleaned air which is free of dust and odors. When it is not necessary to feed outside air to the vehicle passenger compartment C, the valve 34 is set so as to open the inside-air inlet port 33 and simultaneously cover the air filter unit 31 to prevent outside air from flowing through the air filter unit 31. Accordingly, air in the vehicle passenger compartment C is circulated through the inside-air inlet port 33 when the fan unit 29 is operated.

Figure 5:
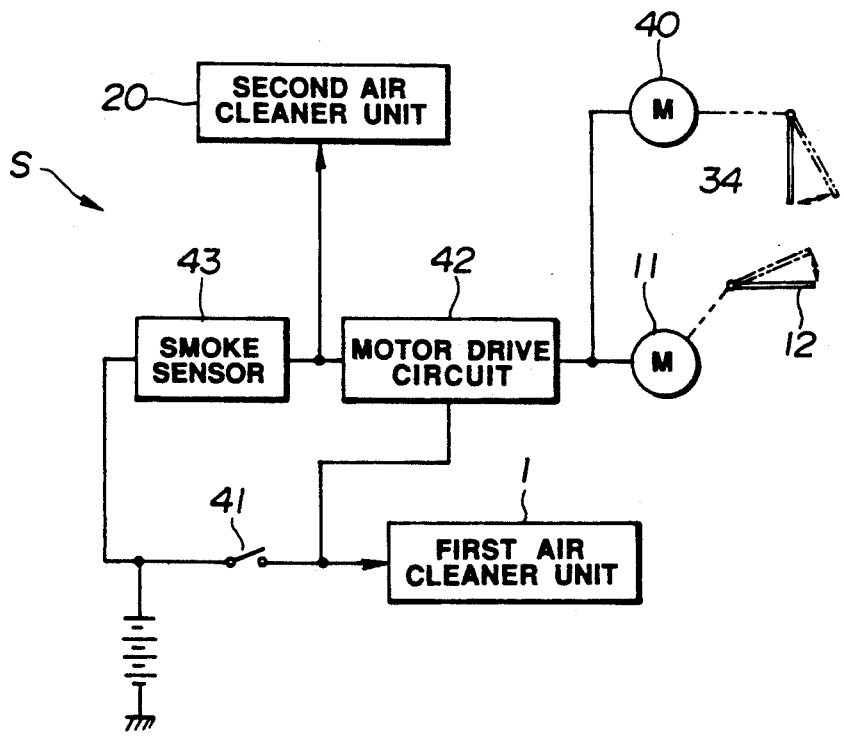
FIG. 5 is a block diagram of a control circuit used in a first embodiment of the air cleaning system.

FIG. 5 shows an electrical circuit diagram for controlling valves 12 and 34, in which a smoke sensor 43 is serially connected to a motor drive circuit 42. The motor drive circuit 42 is electrically connected to the motors 11 and 40 for moving the valves 12 and 34, respectively.

The manner of operation of the thus arranged air cleaning system S will be discussed hereinafter.

Under a condition that the air pollution level in the vehicle passenger compartment C is relatively low, a switch 41 shown in FIG. 5 is turned on to operate the first air cleaner unit 1 and to simultaneously operate the motor 11 of the first air cleaner unit 1 through the motor drive circuit 42 shown in FIG. 5. The valve 12 is rotated to close the discharge port 10 by the operation of the motor 11. Since the second air cleaner unit 20 is not operated at this time, the air in the vehicle passenger compartment C is cleaned by the first air cleaner unit 1. Then, when the air pollution level becomes high due to the smoke generated by smoking and the like in the vehicle passenger compartment C, a smoke sensor 43 disposed in the vehicle passenger compartment C detects the smoke contained in the polluted air and outputs a signal representative of detection of the smoke by the smoke sensor 43 to the second air cleaner unit 20 to start its operation. When the second air cleaner unit 20 is operated, an operation signal for reversely rotating the motors 11 and 40 is fed to the motor drive circuit 42. According to the operation signal, the valve 12 is operated to open the discharge port 10 and the valve 34 is operated to close the inside-air inlet port 33. Accordingly, outside air is fed from the outside-air intake port 23 into the vehicle passenger compartment C through the second air filter unit 31 due to the operation of the fan unit 29. Simultaneously, a part of the air in the vehicle passenger compartment C is discharged to the outside of the vehicle through the discharge port 10. With these operations, the vehicle passenger compartment C is rapidly cleaned.

When the air pollution level in the vehicle passenger compartment C becomes low due to the air cleaning operations as mentioned above, the smoke sensor 43 detects the cleaned condition of air in the vehicle passenger compartment C and outputs a signal to stop the operation of the second air cleaner unit 20 and to return the valves 11 and 40 to the initial positions, respectively. Accordingly, the air cleaning operation is continued only by the first air cleaner unit 1.

With this air cleaning system S, when the air pollution level in the vehicle passenger compartment C is low, only the first air cleaner unit 1 is operated to clean and circulate air in the vehicle passenger compartment C. When the air pollution level becomes high, the second air cleaner unit 20 is operated to inhale and clean outside air, and then feed the cleaned outside air into the vehicle passenger compartment C. Furthermore, the first air cleaner unit 1 is operated to discharge the polluted air of the vehicle passenger compartment C to the outside of the vehicle.

Figure 6:
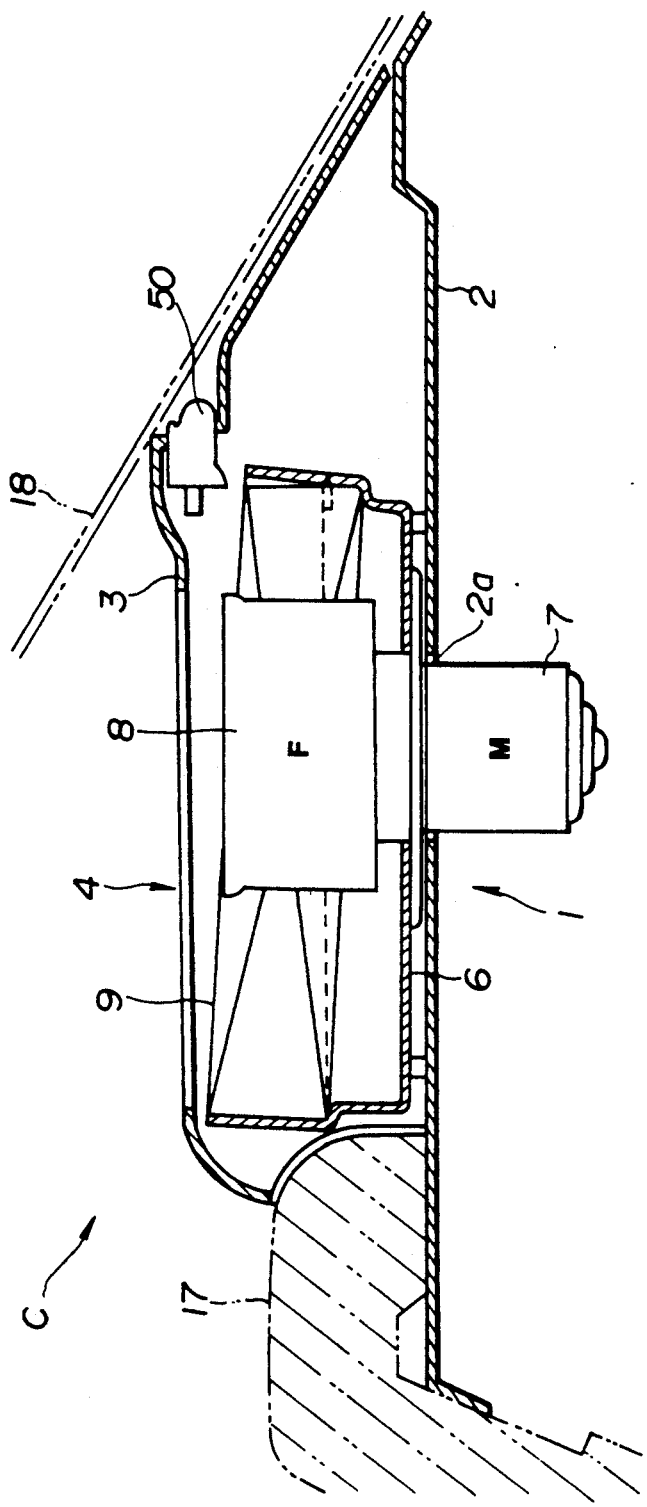
FIG. 6 is a side cross-sectional view of a first air cleaner unit of a second embodiment according to the present invention.
Figure 7:
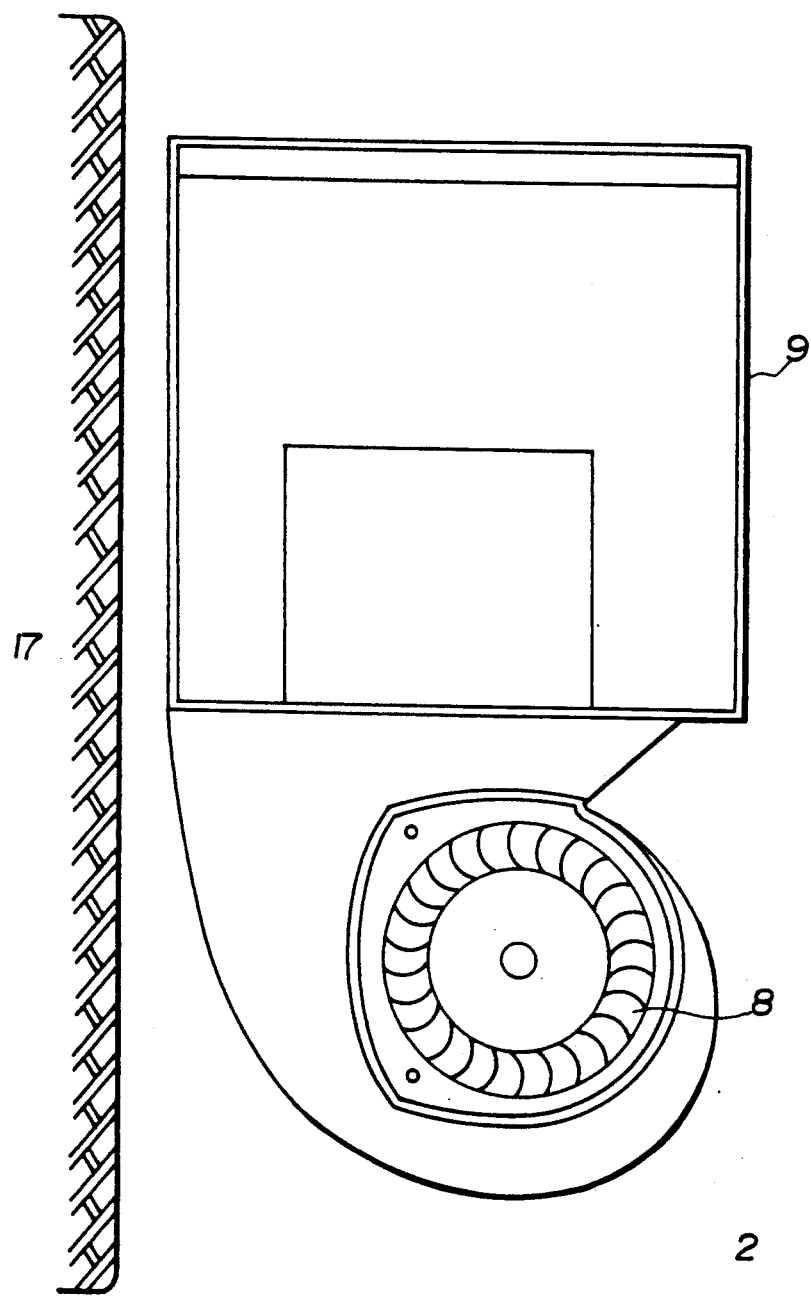
FIG. 7 is a top view of the first air cleaner unit of FIG. 6.
Figure 8:
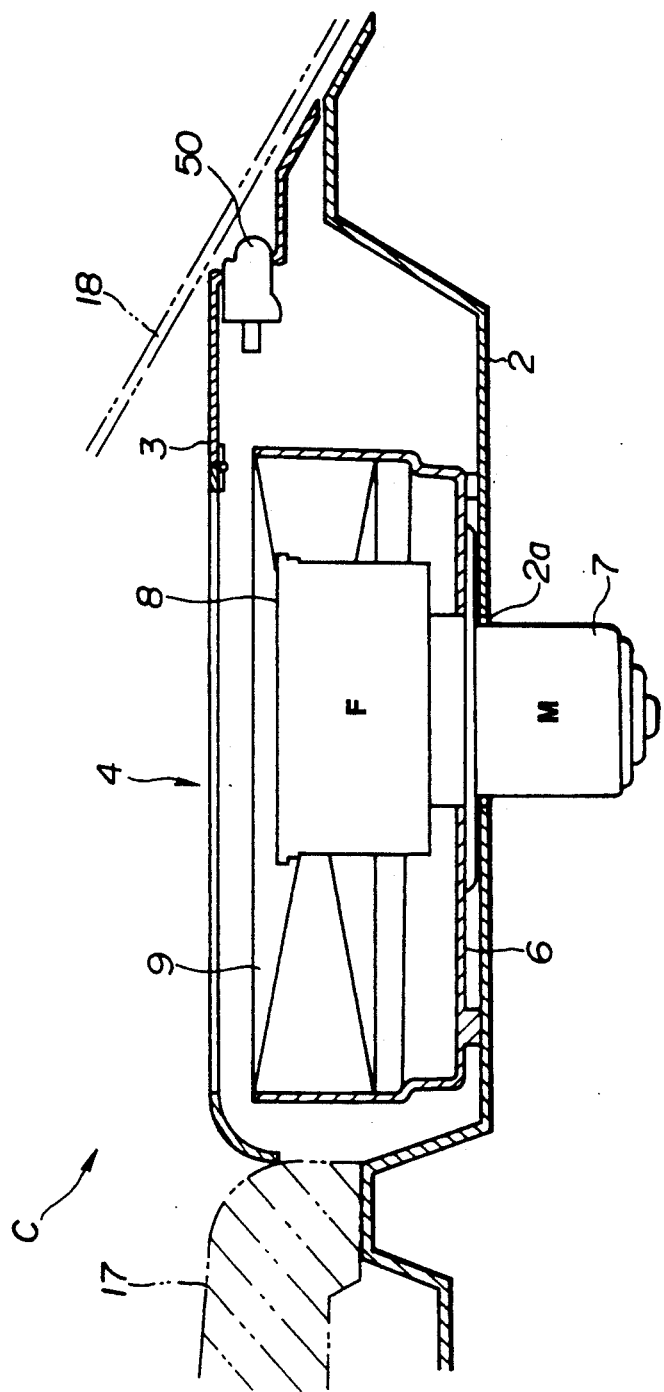
FIG. 8 is a side cross-sectional view of a first air cleaner unit of the second embodiment installed to a lowered rear parcel shelf.
Figure 9:
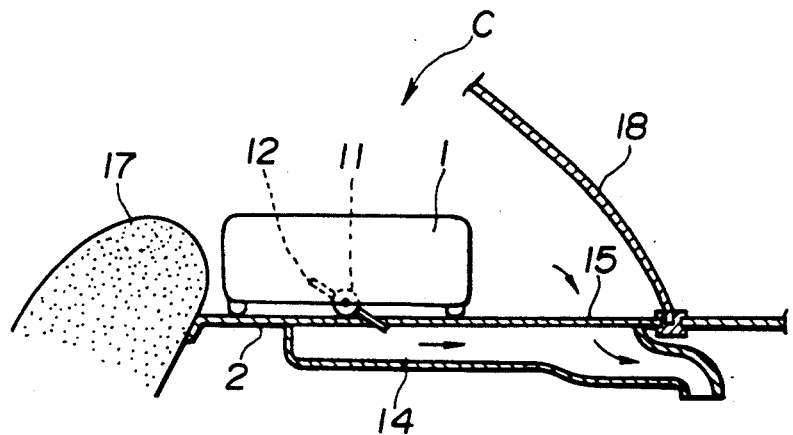
FIG. 9 is a side sectional view of a rear portion of a vehicle passenger compartment to which a first air cleaner unit used in the third embodiment according to the present invention is disposed.
Figure 10:
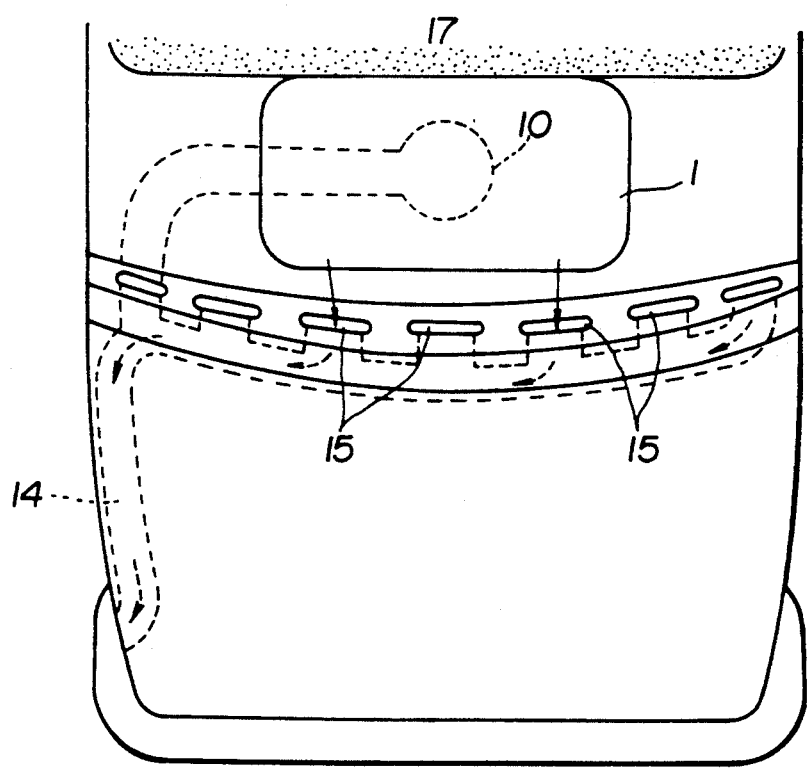
FIG. 10 is a top view of a rear portion of the vehicle to which the air cleaning system of the third embodiment is applied.

Referring to FIGS. 6 to 8, there is shown a second embodiment of the air cleaning system S for a vehicle passenger compartment C in accordance with the present invention.

The air cleaning system S comprises a first air cleaner unit 1 which is disposed on a rear parcel shelf 2 located between a rear seat back 17 and a rear window 18. The first air cleaner unit 1 includes an inner casing 6 having an opening (no numeral) at its upper portion and an outer casing 3 with which the inner casing 6 is covered. The inner casing 6 is provided with an air filter unit 9 made of a dust filter (no numeral) and an activated carbon filter (no numeral), and a flattened fan 8 of a sirocco type, turbo type or radial type. The outer casing 3 has an air intake port 4 for guiding air to the flattened fan 8 and a delivery port 5. A high mounted stop lamp 50 is installed to the outer casing 3 so as to be directed to the rear window 18. A motor 7 for rotating the fattened fan 8 is arranged so as to pass through a hole 2a of the rear parcel shelf 2 and to extend downward as shown in FIG. 6. Thus, the motor 7 is disposed to project outside the inner casing 6. Also, in the second embodiment of the air cleaning system S, a second air cleaner unit (not shown) is similar to that of the first embodiment.

Furthermore, in order to completely prevent the first air cleaner unit 1 from degrading the rearward visibility of a driver, it is preferable to further lower the position of the rear parcel shelf 2 as shown in FIG. 7.

With this arrangement, the first air cleaner unit 1 is arranged so as not to obstruct the rear view for a driver in the vehicle in a manner that the motor 7 is disposed to pass through the rear parcel shelf 2 and to extend downwardly and that the outer casing 3 is formed in a thin-box shape. Accordingly, the rear visibility for the driver is remarkably improved.

Referring to FIGS. 9 to 12, there is shown a third embodiment of the air cleaning system S in accordance with the present invention.

Figure 11:
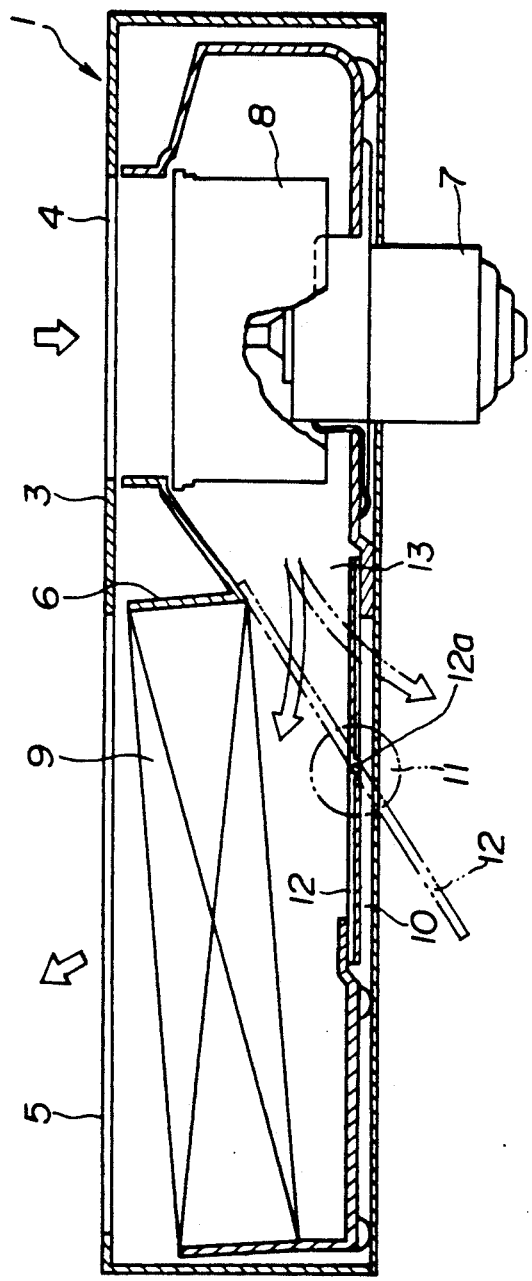
FIG. 11 is a side cross-sectional view of the first air cleaner unit of the third embodiment.

The air cleaning system S comprises a first air cleaner unit 1 which is disposed on a rear parcel shelf 2 located between a rear seat back 17 and a rear window 18 in a vehicle passenger compartment C. The first air cleaner unit 1 is also similar to that of the first embodiment except that a valve 12 is supported at its center portion to the inner casing 6 so as to be rotated around a shaft 12a passing through the center portion of the valve 12 as shown in FIG. 11. Furthermore, a second air cleaner unit 20 disposed to the front portion of the vehicle passenger compartment C is similar to that of the first embodiment. An air discharge passage 14 connected to the discharge port 10 is communicated with a plurality of air intake ports 15 and extends to the outside of the vehicle.

Figure 12:
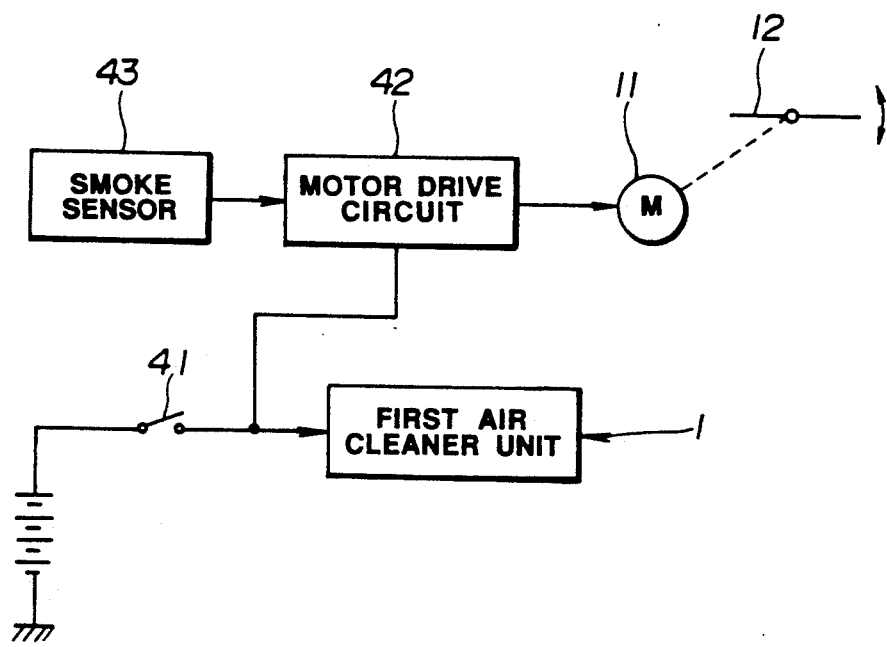
FIG. 12 is a basic block diagram of a control circuit of the third embodiment.

FIG. 12 shows an electrical circuit diagram for controlling valve 12 which is applied to the third embodiment of the air cleaning system S, where a smoke sensor 43 is serially connected with a motor drive circuit 42. The motor drive circuit 42 is electrically connected to the motors 11 for moving the valve 12.

The manner of operation of the thus arranged air cleaning system S will be discussed hereinafter.

When the first air cleaner unit 1 is not operated, air in the vehicle passenger compartment C is slightly exchanged with outside air. When a switch 41 for starting the first air cleaner unit 1 is turned on, the polluted air in the vehicle passenger compartment C is sucked from the intake port 4, and passes through the air filter unit 9 for cleaning the air. Then, the cleaned air is delivered from the delivery port 5 into the vehicle passenger compartment C. These operations are continuously carried out and the air in the vehicle passenger compartment C is gradually cleaned. When these operations are accomplished, the valve 19 is set to close the discharge port 10 as shown by a continuous line in FIG. 11.

When the smoke sensor 43 detects a condition that the air pollution level in the vehicle passenger compartment C is higher than a predetermined level, the smoke sensor 43 outputs a signal representative of the detection of the smoke to the motor drive circuit 42. Due to this operation, the motor drive circuit 42 drives the motor 7 in order to rotate the valve 12 to a position shown by the dotted line in FIG. 11. With this operation, the discharge port 10 is opened and the polluted air in the vehicle passenger compartment C is discharged to the outside of the vehicle through an exhaust conduit (not shown). When the smoke sensor 43 detects a condition that the air in the vehicle passenger compartment C becomes cleaner than a predetermined level, the smoke sensor 43 outputs a second signal indicative of the air cleaned condition to the motor drive circuit 42 in order to reversely move the motor 7 to close the discharge port 10 by the valve 12. Accordingly, the air in the vehicle passenger compartment C is cleaned by the air cleaner unit 1.

What is claimed is:

1. An air cleaner unit disposed on a rear parcel shelf in a vehicle passenger compartment of a vehicle, said air cleaner unit comprising:
   a casing having an air intake port communicated with the vehicle passenger compartment, an air delivery port communicated with the vehicle passenger compartment and an air discharge port communicated with the outside of the vehicle;
   an air filter unit disposed in said casing so that the air fed into said casing is cleaned by said air filter unit and fed to the vehicle passenger compartment through the air delivery port;
   a fan for feeding air from the vehicle passenger compartment to one of the vehicle passenger compartment and the outside of the vehicle;
   a motor for rotating said fan, which is disposed to pass through a lower portion of said casing and the rear parcel shelf and to extend downwardly; and
   a valve connected to said casing so as to take one of first and second states, the first state being that the air intake port is communicated with the air discharge port and the second state being that the air intake port is communicated with the air delivery port through the air filter unit.

2. An air cleaner unit as claimed in claim 1, further comprising a smoke sensor which is disposed in the vehicle passenger compartment and detects the air pollution level in the vehicle passenger compartment, said smoke sensor outputting a signal to said valve and said fan unit to discharge the air of the vehicle passenger compartment to the outside of the vehicle when the air pollution level in the vehicle passenger compartment is higher than a predetermined level.

3. An air cleaning system for a vehicle passenger compartment of a vehicle, said air cleaning system comprising:
   a first air cleaner unit installed on a rear parcel shelf in the vehicle passenger compartment, said first air cleaner unit including means for discharging air of the vehicle passenger compartment to the outside of the vehicle; and
   a second air cleaner unit installed in an instrument panel in the vehicle passenger compartment, said second air cleaner unit including means for inhaling cleaning outside air into the vehicle passenger compartment and for cleaning the outside air, the air discharging means of said first air cleaner unit being operated when the outside air inhaling means of said second air cleaner is operated.

4. An air cleaning system as claimed in claim 3, wherein said first air cleaner unit includes a fan unit for feeding air from the vehicle passenger compartment to one of the vehicle passenger compartment and the outside of the vehicle.

5. An air cleaning system as claimed in claim 3, wherein said second air cleaner unit includes an air filter unit which cleans the air fed into said second air cleaner unit.

6. An air cleaning system for a vehicle passenger compartment of a vehicle, said air cleaning system comprising:
   a first air cleaner unit including means for discharging air of the vehicle passenger compartment to the outside of the vehicle;
   a second air cleaner unit including means for inhaling cleaning outside air into the vehicle passenger compartment and for cleaning the outside air, the air the air discharging means of said first air cleaner unit being operated when the outside air inhaling means of said second air cleaner is operated; and
   a smoke sensor disposed in the vehicle passenger compartment for detecting an air pollution level in the vehicle passenger compartment, said smoke sensor outputting a signal to said first air cleaner unit to discharge the air of the vehicle passenger compartment to the outside of the vehicle when the air pollution level in the vehicle passenger compartment is higher than a predetermined level.

7. An air cleaning system as claimed in claim 6, wherein said first air cleaner unit includes a fan unit for feeding air from the vehicle passenger compartment to one of the vehicle passenger compartment and the outside of the vehicle.

8. An air cleaning system as claimed in claim 6, wherein said second air cleaning unit includes an air filter unit which cleans the air fed into said second air cleaner unit.

9. An air cleaning system disposed on a rear parcel shelf in a vehicle passenger compartment of a vehicle, said air cleaning system comprising:
   a casing having an air intake port communicated with the vehicle passenger compartment, an air delivery port communicated with the vehicle passenger compartment and an air discharge port communicated with the outside of the vehicle;
   an air filter unit disposed in said casing so that the air fed in said casing is cleaned by said air filter unit and fed to the vehicle passenger compartment through the air delivery port;
   a fan unit for feeding air from the vehicle passenger compartment to one of the vehicle passenger compartment and the outside of the vehicle;
   a valve connected to said casing so as to take one of first and second states, the first state being that the air intake port is communicated with the air discharge port and the second state being that the air intake port is communicated with the air delivery port through the air filter unit; and
   a smoke sensor disposed in the vehicle passenger compartment and detecting the air pollution level in the vehicle passenger compartment, said smoke sensor outputting a signal to said valve and said fan unit to discharge the air of the vehicle passenger compartment to the outside of the vehicle when the air pollution level in the vehicle passenger compartment is higher than a predetermined level.

* * * * *